US011016310B2

(12) United States Patent
Heslouis et al.

(10) Patent No.: US 11,016,310 B2
(45) Date of Patent: May 25, 2021

(54) METHOD FOR DETERMINING A THREE DIMENSIONAL PERFORMANCE OF AN OPHTHALMIC LENS; ASSOCIATED METHOD OF CALCULATING AN OPHTHALMIC LENS

(71) Applicant: Essilor International, Charenton-le-Pont (FR)

(72) Inventors: Melanie Heslouis, Charenton-le-Pont (FR); Sebastien Fricker, Charenton-le-Pont (FR); Cyril Guilloux, Charenton-le-Pont (FR); Benjamin Rousseau, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 236 days.

(21) Appl. No.: 15/768,353

(22) PCT Filed: Oct. 11, 2016

(86) PCT No.: PCT/EP2016/074349
§ 371 (c)(1),
(2) Date: Apr. 13, 2018

(87) PCT Pub. No.: WO2017/064065
PCT Pub. Date: Apr. 20, 2017

(65) Prior Publication Data
US 2018/0299696 A1   Oct. 18, 2018

(30) Foreign Application Priority Data

Oct. 15, 2015  (EP) .................................... 15306644
Oct. 15, 2015  (EP) .................................... 15306646

(Continued)

(51) Int. Cl.
*G02C 7/02*      (2006.01)
*G02C 7/06*      (2006.01)

(52) U.S. Cl.
CPC ............. *G02C 7/027* (2013.01); *G02C 7/028* (2013.01); *G02C 7/061* (2013.01); *G02C 2202/06* (2013.01)

(58) Field of Classification Search
CPC ........ G02C 7/024; G02C 7/025; G02C 7/027; G02C 7/028; G02C 7/041; G02C 7/06;
(Continued)

(56) References Cited

U.S. PATENT DOCUMENTS 6,318,859 B1   11/2001  Baudart et al.
8,915,589 B2   12/2014  Esser et al.
(Continued)

FOREIGN PATENT DOCUMENTS

| EP | 1 291 633 A2 | 3/2003 |
| EP | 2 177 943 A1 | 4/2010 |
| EP | 2 600 186 A1 | 6/2013 |
| EP | 2 695 578 A1 | 2/2014 |
| FR | 2 928 745 A1 | 9/2009 |
| WO | WO 2010/043704 A1 | 4/2010 |

OTHER PUBLICATIONS

International Search Report dated Jan. 4, 2017 in PCT/EP2016/074349, 4 pages.
(Continued)

*Primary Examiner* — Marin Pichler
(74) *Attorney, Agent, or Firm* — Oblon, McClelland, Maier & Neustadt, L.L.P.

(57) ABSTRACT

A method for determining a three dimensional performance of an ophthalmic lens including: calculating a domain in which a condition between a local optical criterion and at a threshold value is fulfilled; determining the three dimensional performance of the ophthalmic lens according to the domain. A method of calculating an ophthalmic lens includes the method.

9 Claims, 11 Drawing Sheets

(30) Foreign Application Priority Data

| | | |
|---|---|---|
| Oct. 15, 2015 | (EP) | 15306647 |
| Oct. 15, 2015 | (EP) | 15306655 |
| Nov. 27, 2015 | (EP) | 15306891 |
| Feb. 2, 2016 | (EP) | 16305113 |

(58) Field of Classification Search
CPC ........ G02C 7/061; G02C 7/063; G02C 7/065; G02C 7/066
USPC .................................................. 351/159.42
See application file for complete search history.

(56) References Cited

U.S. PATENT DOCUMENTS

| | | |
|---|---|---|
| 2003/0076479 A1 | 4/2003 | Qi |
| 2011/0001925 A1 | 1/2011 | Drobe et al. |
| 2011/0202286 A1 | 8/2011 | De Rossi et al. |
| 2012/0105609 A1 | 5/2012 | Qi |
| 2013/0027657 A1 | 1/2013 | Esser et al. |
| 2013/0179297 A1 | 7/2013 | Yamakaji |
| 2015/0212342 A1 | 7/2015 | Giraudet et al. |

OTHER PUBLICATIONS

Allione, P., et al., "Application of Optimization in Computer-Aided Ophthalmic Lens Design", EUROPTO Conference on Design and Engineering of Optics Systems, vol. 3737, May 1999, pp. 138-148.

METHOD FOR DETERMINING A THREE DIMENSIONAL PERFORMANCE OF AN OPHTHALMIC LENS; ASSOCIATED METHOD OF CALCULATING AN OPHTHALMIC LENS

The invention relates generally to the field of vision improvement and more specifically concerns a method for determining a three dimensional performance of an ophthalmic lens. It also relates to a method of calculating an ophthalmic lens. According to an embodiment, the present invention relates to ophthalmic progressive addition lenses.

Ophthalmic lenses are corrective lenses or non corrective lenses worn in front of the eye. Corrective lenses are mainly used to treat myopia, hyperopia, astigmatism, and presbyopia. According to the present invention, ophthalmic lenses refer to "glasses" or "spectacles" and are worn on the face a short distance in front of the eye.

Ophthalmic progressive addition lenses are well-known lenses suitable for the correction of presbyopia and other disorders of accommodation that provide comfortable vision at all distances or at least at a plurality of distances. Conventionally, spectacles lenses are manufactured on request in accordance with specifications intrinsic to individual wearers. Such specifications generally encompass a medical prescription made by an ophthalmologist or an eye care practitioner. For presbyopic wearers, the value of the power correction is different for far vision and near vision, due to the difficulties of accommodation in near vision. The prescription thus comprises a far-vision power value and an addition representing the power increment between far vision and near vision. The addition is qualified as prescribed addition $ADD_p$.

Performances of ophthalmic lenses, as for example of ophthalmic progressive addition lenses, are currently evaluated for a given wearer in a plurality of gaze directions. Said performances can be used to select an ophthalmic lens, as for example an ophthalmic progressive addition lens, for said wearer and/or for calculating an ophthalmic lens, as for example an ophthalmic progressive addition lens, that takes into account said performance thanks to an optimization calculation method.

The inventors have noticed that there is still a need for providing new routes to express performances of an ophthalmic lens for a given wearer, as for example of an ophthalmic progressive addition lens for a given presbyopic wearer, and that using said performances is suitable for enhancing the wearer's visual comfort.

A problem that the invention aims to solve is thus to enhance the wearer's visual comfort thanks to providing new routes to express performances of an ophthalmic lens, as for example of an ophthalmic progressive addition lens.

For this purpose, a subject of the invention is a method implemented by computer means for determining a three dimensional performance of an ophthalmic lens, as for example of an ophthalmic progressive addition lens, delimited by a given contour for a wearer with a given prescription and given wearing conditions, the said three dimensional performance being determined for a plurality of gaze directions $(\alpha,\beta)$ at a plurality of proximities, the method comprising the steps of:

i. Providing at least one local optical criterion;
ii. Providing for each local optical criterion of the local optical criteria of step i. a threshold function which gives threshold values for the said local optical criterion as a function of the proximity;
iii. Providing for each local optical criterion of the local optical criteria of step i. a condition between the said local optical criterion and the threshold values of step ii. provided for said local optical criterion;
iv. Calculating a domain where the condition(s) of step iii. between the local optical criterion (criteria) of step i. and the threshold values of step ii. are fulfilled;
v. Determining the three dimensional performance of the ophthalmic progressive addition lens according to the domain calculated in step iv.

The inventors have demonstrated that such a three dimensional performance is suitable for better expressing performances of an ophthalmic lens for a given wearer, as for example of an ophthalmic progressive addition lens for a given presbyopic wearer. They have furthermore demonstrated that said three dimensional performance can be advantageously used to calculate an ophthalmic lens for a given wearer and that resulting lens can offer an improved vision comfort for said wearer.

In the frame of the present invention, a local optical criterion is an optical criterion that can be defined for each point of the three dimensional object or image space.

In the frame of the present invention, a domain is a three dimensional domain incorporating points corresponding to gaze directions and proximities where the features of step iv. are fulfilled. A domain can be for example defined according to an (x,y,z) spatial reference system or according to an $(\alpha,\beta,ProxO)$ spatial reference system or according to an $(\alpha,\beta,ProxI)$ spatial reference system, where $\alpha$ is a lowering angle (in degree) and $\beta$ is an azimuth angle (in degree), ProxO is an object proximity and ProxI is an image proximity.

Thanks to the method of the present invention, one provides a three dimensional performance that allow characterizing a performance of an ophthalmic lens in 3D, for example according to a plurality of gaze directions and a plurality of viewing distances. Such a three dimensional performance differs from current ophthalmic lens performances which are evaluated according to a plurality of gaze directions, but for only one viewing distance for each gaze direction.

According to different embodiments of the method for determining a three dimensional performance of the present invention, that may be combined:

the proximity is an object proximity, ProxO; according to another embodiment, the proximity is an image proximity, ProxI;
the local optical criterion (criteria) of step i. is (are) chosen within the list consisting of: mean refractive power error; residual power error; resulting astigmatism; acuity loss; relative acuity; prismatic deviation; ocular deviation; local magnification; High Order Aberration (HOA); variation and/or combination of preceding criteria; according to an embodiment, the local optical criterion (criteria) of step i. is acuity loss;
the condition between a local optical criterion of step i. and a threshold value of step ii. is an inequality between the said local optical criterion and the said threshold value;
the determining step v. of the three dimensional performance of the ophthalmic lens is calculating the internal volume of the domain of step iv.;
the calculation of step iv. is performed in binocular vision for the wearer;
according to another embodiment, the calculation of step iv. is performed in monocular vision for the wearer;

the method comprises a further step of calculating and displaying data to a terminal so as to provide a graphical representation of the three dimensional performance of step v.;

a threshold function of step ii. is a function of one or of a plurality of parameter(s) chosen within the list of parameters consisting of: a fixation point position; a gaze direction; a visual task; lighting conditions; an age; a gender; a subject's visual acuity;

the ophthalmic lens is an ophthalmic progressive addition lens.

In another aspect, the present invention also provides a computer program product comprising one or more stored sequence of instruction that is accessible to a processor and which, when executed by the processor, causes the processor to carry out the steps of the here above recited method for determining a three dimensional performance. The present invention also provides a computer-readable medium carrying one or more sequences of instructions of the said computer program product.

In still another aspect, the present invention also provides a method implemented by computer means of calculating an ophthalmic lens, as for example of an ophthalmic progressive addition lens, delimited by a given contour for a wearer with a given prescription and given wearing conditions, said method comprising a step of providing a three dimensional performance target domain defined as a function of a three dimensional performance domain and using said three dimensional performance target to calculate the ophthalmic lens for the wearer. According to an embodiment, the domain is determined according to steps i. to iv. of the here above recited method for determining a three dimensional performance.

In still another aspect, the present invention also provides a method implemented by computer means of calculating an ophthalmic lens delimited by a given contour for a wearer with a given prescription and given wearing conditions, said method comprising a step of providing a three dimensional performance target defined as a function of the three dimensional performance, where the three dimensional performance is a measured performance for the said wearer, and using said three dimensional performance target to calculate the ophthalmic lens for the wearer.

According to different embodiments of the methods for calculating an ophthalmic lens of the present invention, that may be combined:

the three dimensional performance target is equal to the three dimensional performance;

the method of calculating an ophthalmic lens comprises an optimization step implementing a plurality of targets, said targets comprising at least the prescription of the wearer and the three dimensional performance target;

a local optical criterion of step i. is acuity loss of the wearer and wherein one calculates a mean refractive power, PPO, a module of resulting astigmatism, ASR, for a plurality of gaze directions and for a plurality of proximities, so as to calculate the said acuity loss according to an acuity loss model.

In still another aspect, the present invention also provides a computer program product comprising one or more stored sequence of instruction that is accessible to a processor and which, when executed by the processor, causes the processor to carry out the steps of the here above recited method for calculating an ophthalmic lens. The present invention also provides a computer-readable medium carrying one or more sequences of instructions of the said computer program product.

Unless specifically stated otherwise, as apparent from the following discussions, it is appreciated that throughout the specification discussions utilizing terms such as "computing", "calculating" "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

The features of the present invention, as well as the invention itself, both as to its structure and its operation, will be best understood from the accompanying non limiting drawings and examples, taken in conjunction with the accompanying description, in which.

Skilled artisans can appreciate that elements in the figures are illustrated for simplicity and clarity and have not necessarily been drawn to scale. For example, the dimensions of some of the elements in the figures may be exaggerated relative to other elements to help to improve the understanding of the embodiments of the present invention.

On the figures, following references correspond to followings:

MER is the meridian line;
NVGD is the near vision gaze direction;
FVGD is the far vision gaze direction;
FCGD is the fitting cross gaze direction.

The following definitions are provided so as to define the wordings used within the frame of the present invention.

Definitions

The following definitions are provided so as to define the wordings used within the frame of the present invention.

The wordings "wearer's prescription", also called "prescription data", are known in the art. Prescription data refers to one or more data obtained for the wearer and indicating for at least an eye, preferably for each eye, a prescribed sphere $SPH_p$, and/or a prescribed astigmatism value $CYL_p$ and a prescribed axis $AXIS_p$ suitable for correcting the ametropia of each eye of the wearer and, if suitable, a prescribed addition $ADD_p$ suitable for correcting the presbyopia of each of his eyes.

The term "ophthalmic lens" is to be understood to mean any type of known lens intended to be supported by a wearer's face. The term can refer to non-corrective lenses, corrective lenses, such as progressive addition lenses, unifocal, occupational or multifocal lenses. The term can also refer to said ophthalmic lenses which could present at least one added value such as, for example, tint, photochromism, polarization filtering, electrochromism, antireflective properties, antiscratch properties. The lens may be also a lens for information glasses, wherein the lens comprises means for displaying information in front of the eye . . . .

All ophthalmic lenses of the invention may be paired so as to form a pair of lenses (left eye LE, right eye RE).

"Progressive ophthalmic addition lenses" are known in the art. They provide comfortable vision for a presbyopic wearer at all distances.

Figure 1:
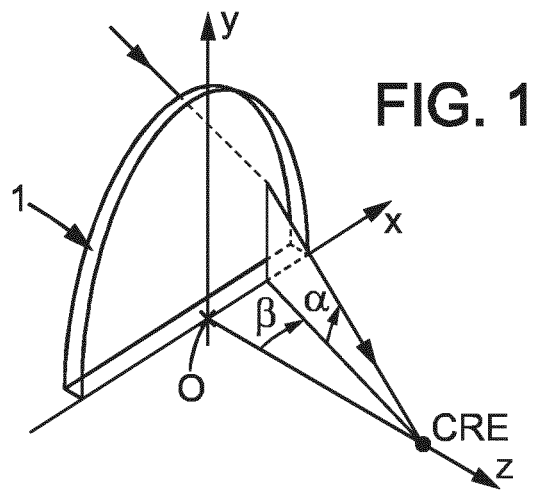
FIGS. 1 and 2 show, diagrammatically, optical systems of eye and lens and ray tracing from the center of rotation of the eye when considering monocular vision.
Figure 2:
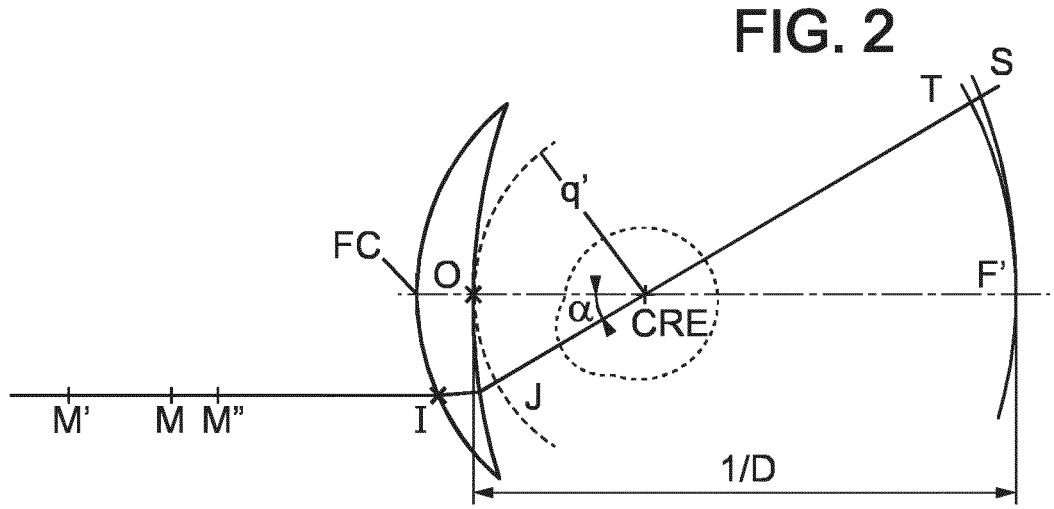

A "gaze direction" is identified by a couple of angle values $(\alpha,\beta)$, wherein said angles values are measured with regard to reference axes centered on the center of rotation of the eye, commonly named as "CRE". More precisely, FIG. 1 represents a perspective view of such a system illustrating parameters $\alpha$ and $\beta$ used to define a gaze direction. FIG. 2 is a view in the vertical plane parallel to the antero-posterior axis of the wearer's head and passing through the center of rotation of the eye in the case when the parameter $\beta$ is equal to 0. The center of rotation of the eye is labeled CRE. The axis CRE-F', shown on FIG. 2 in a dot-dash line, is the horizontal axis passing through the center of rotation of the eye and extending in front of the wearer—that is the axis CRE-F' corresponding to the primary gaze direction. The lens is placed and centered in front of the eye such that the axis CRE-F' cuts the front surface of the lens on a point called the fitting cross, which is, in general, present on lenses to enable the positioning of lenses in a frame by an optician. The point of intersection of the rear surface of the lens and the axis CRE-F' is the point, O. A vertex sphere, which center is the center of rotation of the eye, CRE, and has a radius q'=O-CRE, intercepts the rear surface of the lens in a point of the horizontal axis. A value of radius q' of 25.5 mm corresponds to a usual value and provides satisfying results when wearing the lenses. Other value of radius q' may be chosen. A given gaze direction, represented by a solid line on FIG. 1, corresponds to a position of the eye in rotation around CRE and to a point J (see FIG. 2) of the vertex sphere; the angle $\beta$ is the angle formed between the axis CRE-F' and the projection of the straight line CRE-J on the horizontal plane comprising the axis CRE-F'; this angle appears on the scheme on FIG. 1. The angle $\alpha$ is the angle formed between the axis CRE-J and the projection of the straight line CRE-J on the horizontal plane comprising the axis CRE-F'; this angle appears on the scheme on FIGS. 1 and 2. A given gaze view thus corresponds to a point J of the vertex sphere or to a couple $(\alpha,\beta)$. The more the value of the lowering gaze angle is positive, the more the gaze is lowering and the more the value is negative, the more the gaze is rising. In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens. I is the point of the ray that intercepts the front face (opposite to the eye) of the lens on the path to the image of the point M in the object space. Further images of points M' and M" in the object space can be considered, located at different object distances.

For each gaze direction $(\alpha,\beta)$, a mean refractive power $PPO(\alpha,\beta)$, a module of astigmatism $AST(\alpha,\beta)$ and an axis $AXE(\alpha,\beta)$ of this astigmatism, and a module of resulting (also called residual or unwanted) astigmatism $ASR(\alpha,\beta)$ are defined.

"Astigmatism" refers to astigmatism generated by the lens, or to residual astigmatism (resulting astigmatism) which corresponds to the difference between the prescribed astigmatism (wearer astigmatism) and the lens-generated astigmatism; in each case, with regards to amplitude or both amplitude and axis;

"Ergorama" is a function associating to each gaze direction the usual distance of an object point. Typically, in far vision following the primary gaze direction, the object point is at infinity. In near vision, following a gaze direction essentially corresponding to an angle $\alpha$ of the order of 35° and to an angle $\beta$ of the order of 5° in absolute value towards the nasal side, the object distance is of the order of 30 to 50 cm. For more details concerning a possible definition of an ergorama, US patent U.S. Pat. No. 6,318,859 may be considered. This document describes an ergorama, its definition and its modeling method. For a method of the invention, points may be at infinity or not. Ergorama may be a function of the wearer's ametropia. Using these elements, it is possible to define a wearer optical power and astigmatism, in each gaze direction. An object point M at an object distance given by the ergorama is considered for a gaze direction $(\alpha,\beta)$. An object proximity ProxO is defined for the point M on the corresponding light ray in the object space as the inverse of the distance MJ between point M and point J of the vertex sphere:

$$ProxO = 1/MJ$$

This enables to calculate the object proximity within a thin lens approximation for all points of the vertex sphere, which is used for the determination of the ergorama. For a real lens, the object proximity can be considered as the inverse of the distance between the object point and the front surface of the lens, on the corresponding light ray.

For the same gaze direction $(\alpha,\beta)$, the image of a point M having a given object proximity is formed between two points S and T which correspond respectively to minimal and maximal focal distances (which would be sagittal and tangential focal distances). The quantity ProxI is called image proximity of the point M:

$$ProxI = \frac{1}{2}\left(\frac{1}{JT} + \frac{1}{JS}\right)$$

By analogy with the case of a thin lens, it can therefore be defined, for a given gaze direction and for a given object proximity, i.e. for a point of the object space on the corresponding light ray, an optical power PPO as the sum of the image proximity and the object proximity.

$$PPO = ProxO + ProxI$$

The optical power is also called refractive power.
With the same notations, an astigmatism AST is defined for every gaze direction and for a given object proximity as:

$$AST = \left|\frac{1}{JT} - \frac{1}{JS}\right|$$

This definition corresponds to the astigmatism of a ray beam created by the lens.

The resulting astigmatism ASR is defined for every gaze direction through the lens as the difference between the actual astigmatism value AST for this gaze direction and the prescribed astigmatism for the same lens. The residual astigmatism (resulting astigmatism) ASR more precisely corresponds to module of the vectorial difference between actual (AST, AXE) and prescription data ($CYL_p$, $AXIS_p$).

When the characterization of the lens is of optical kind, it refers to the ergorama-eye-lens system described above. For simplicity, the term 'lens' is used in the description but it has to be understood as the 'ergorama-eye-lens system'. The values in optic terms can be expressed for gaze directions.

Conditions suitable to determine of the ergorama-eye-lens system are called in the frame present invention "as-worn conditions".

In the remainder of the description, terms like «up», «bottom», «horizontal», «vertical», «above», «below», or other words indicating relative position may be used. These terms are to be understood in the wearing conditions of the lens. Notably, the "upper" part of the lens corresponds to a negative lowering angle $\alpha<0°$ and the "lower" part of the lens corresponds to a positive lowering angle $\alpha>0°$.

A "far-vision gaze direction", referred as FVGD, is defined for a lens, as the vision gaze direction corresponding to the far vision (distant) reference point and thus ($\alpha_{FV}$, $\beta_{FV}$), where the mean refractive power is substantially equal to the mean prescribed power in far vision, the mean prescribed power being equal to $SPH_p+(CYL_p/2)$. Within the present disclosure, far-vision is also referred to as distant-vision.

A "near-vision gaze direction", referred as NVGD, is defined for a lens, as the vision gaze direction corresponding to the near vision (reading) reference point, and thus ($\alpha_{NV}$, $\beta_{NV}$), where the refractive power is substantially equal to the prescribed power in far vision plus the prescribed addition, $ADD_p$.

A "fitting-cross gaze direction", referred as FCGD, is defined for a lens, as the vision gaze direction corresponding to the fitting cross reference point and thus ($\alpha_{FC}$, $\beta_{FC}$).

The "meridian line", referred as $ML(\alpha,\beta)$, of a progressive lens is a line defined from top to bottom of the lens and usually passing through the fitting cross where one can see clearly an object point. Said meridian line is defined on the basis of the repartition of module of resulting astigmatism, ASR, over the ($\alpha$, $\beta$) domain and substantially correspond to the center of the two central iso-module of resulting astigmatism values which value is equal to 0.25 Diopter.

A "three dimensional performance of an ophthalmic lens" refers to a feature of said lens that quantifies a spatial three dimensional parameter expressed according to a local optical criterion; as for an example, such a three dimensional performance is a volume;

A "local optical criterion" is an optical criterion that can be defined for each point of the space and can be expressed in the three dimensional object space or in the three dimensional image space. According to an embodiment, an optical criterion is defined in a (x, y, z) coordinate system. According to another embodiment, an optical criterion is defined in a ($\alpha,\beta$,ProxO) coordinate system or in a ($\alpha,\beta$,ProxI) coordinate system. A local criterion can be defined in central vision or in peripheral vision. When defining the local criterion in peripheral vision, one defines the center of the pupil of the eye as the origin for ray-tracing.

A "mean refractive power error", referred as PE_P, is defined as the mean refractive power difference between the actual addition brought by the lens and the proximity, at a given point of the object space ($\alpha,\beta$,ProxO), according to following equation:

PE_$P(\alpha,\beta,ProxO) = PPO(\alpha,\beta,ProxO) - PPO(FV) - ProxO$;

Where PPO(FV) is the mean refractive power of the lens according
to the far-vision gaze direction, for an object located at infinity.

A "residual power error", referred as RPE_P, is defined as the mean refractive power resulting of the mean refractive power error and the objective accommodation of the wearer, at a given point of the object space ($\alpha,\beta$,ProxO); an example of an embodiment of calculation of residual power error is provided here below.

A "relative acuity", referred as AC %_P, is defined as the result of a function of the mean refractive power error, PE_P, and of the resulting astigmatism, ASR, according to an acuity model, at a given point of the object space ($\alpha,\beta$, ProxO); an example of an embodiment of calculation of relative acuity is provided here below.

An "acuity loss", referred as ACU_P, is defined as a function of the relative acuity at a given point of the object space ($\alpha,\beta$,ProxO), according to following equation:

ACU_$P(\alpha,\beta,ProxO) = -\log(AC \%\_P(\alpha,\beta,ProxO)/100)$;

Where "log" is the logarithm in base 10.

A "prismatic deviation" is defined in the object space by the angular deviation of a ray issued from the center of the entrance pupil introduced by the quantity of prism of the lens; a figure and a corresponding description that illustrate said definition can be found in patent document WO2010/043704 A1 that is hereby integrated by reference.

An "ocular deviation" describes the fact that adding a lens causes an eye to rotate in order to stay focused on the same object. The angle can be measured in degrees; a figure and a corresponding description that illustrate said definition can be found in patent document WO2010/043704 A1 that is hereby integrated by reference.

A "local magnification" is defined as the ratio between the apparent angular size (or the solid angle) of an object centered around a given $(\alpha,\beta,ProxO)$ point and seen without the lens and the apparent angular size (or the solid angle) of said object seen through the lens.

"High Order Aberrations (HOA)" are aberrations that are well known for a person skilled in the art and correspond to third orders and above aberrations expressed for example in the frame of a wave front analysis thanks to Zernike polynomials. Such an analysis is for example recommended by the Optical Society of America (OSA) for describing ocular wavefront aberrations, but other polynomials, such as for example Taylor series or splines can also be used to mathematically describe a wavefront. Local optical criteria at a $(\alpha,\beta,ProxO)$ point can be accordingly calculated.

Figure 3:
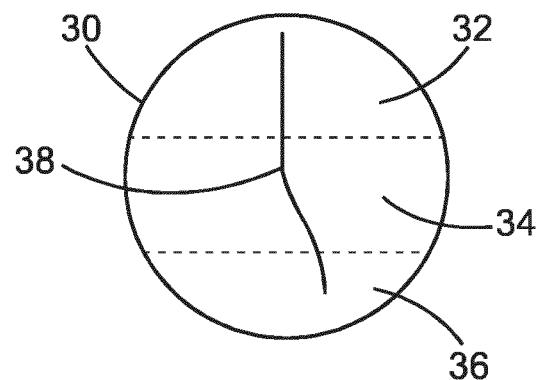
FIG. 3 shows field vision zones of an ophthalmic progressive addition lens.

FIG. 3 shows field vision zones of an ophthalmic progressive addition lens 30 where said lens comprises a far vision (distant vision) zone 32 located in the upper part of the lens, a near vision zone 36 located in the lower part of the lens and an intermediate zone 34 situated between the far vision zone 32 and the near vision zone 36. The meridian line is referred as 38.

FIRST EXAMPLE

A first example is given which is directed to an embodiment of the method of the present invention, implemented by computer means, for determining a three dimensional performance of an ophthalmic progressive addition lens delimited by a given contour for a wearer with a given prescription and given wearing conditions, the method comprising the steps of:

i. Providing a local optical criterion;
ii. Providing for the local optical criterion of step i. a threshold function which gives a plurality of threshold values for the said local optical criterion;
iii. Providing for the optical criterion of step i. a condition between the said local optical criterion and the threshold values of step ii. provided for said local optical criterion;
iv. Calculating a domain where the condition of step iii. between the local optical criterion of step i. and the threshold values of step ii. is fulfilled; v. Determining the three dimensional performance of the ophthalmic progressive addition lens according to the domain calculated in step iv.

In said example:
the local optical criterion of step i. is the acuity loss;
the condition between the local optical criterion of step i. and the threshold values of step ii. is an inequality between the acuity loss and the threshold values;
the determining step v. of the three dimensional performance of the ophthalmic progressive addition lens is calculating the internal volume of the domain of step iv.;
the calculation of step iv. is performed in monocular vision for the wearer;
the threshold function of step ii. is a function of the subject's visual acuity;
the said method may comprise a further step of calculating and displaying data to a terminal so as to provide a graphical representation of the three dimensional performance of step v.

Figure 4:
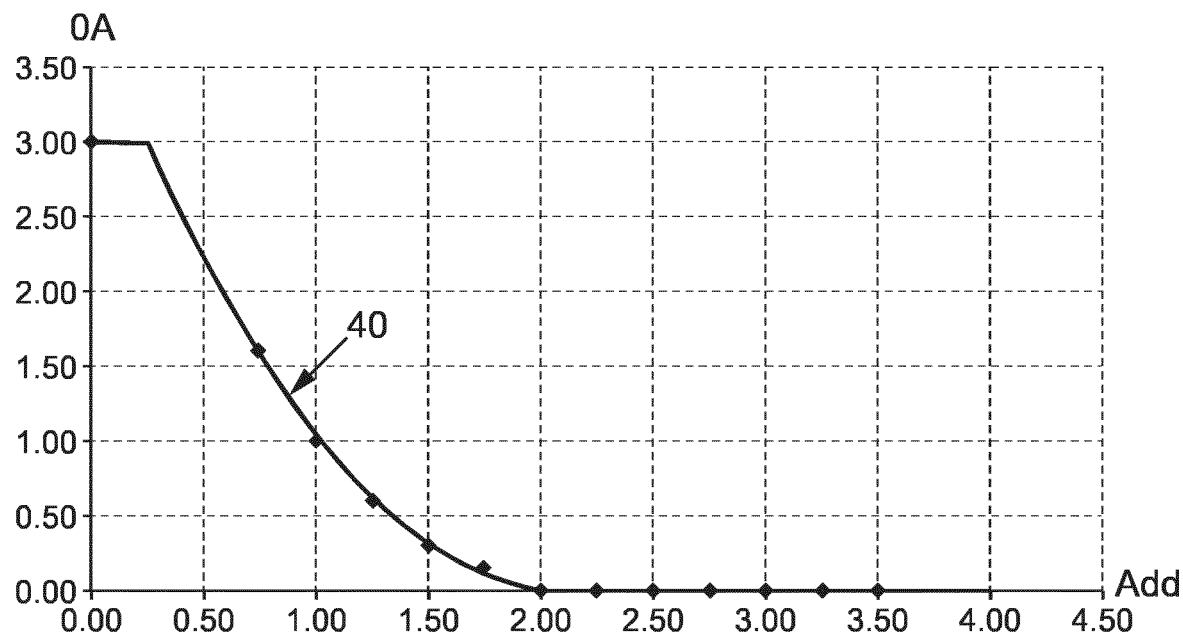
FIG. 4 shows a variation model of objective accommodation as a function of prescribed addition.
Figure 5:
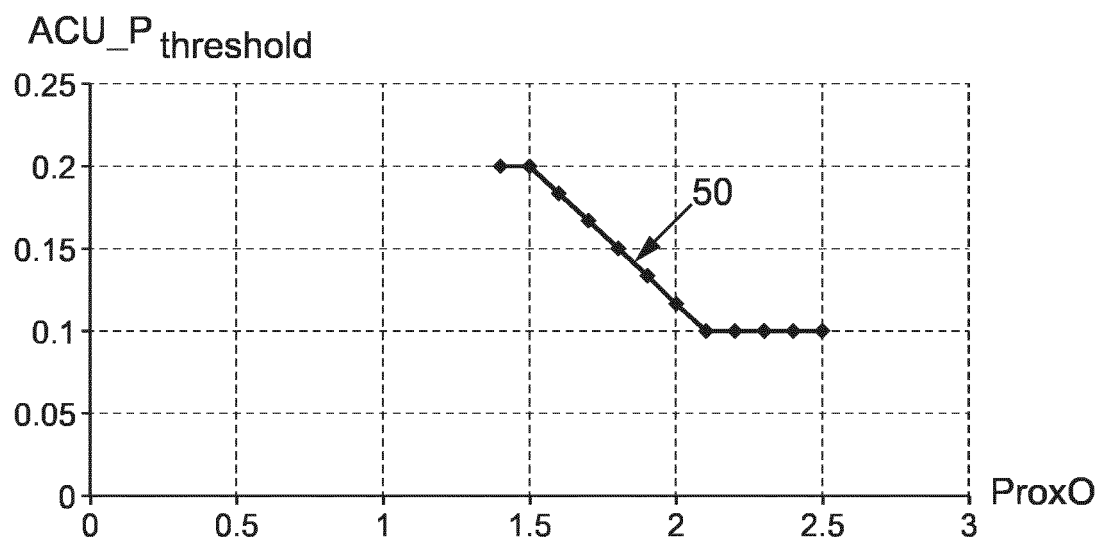
FIG. 5 shows a variation model of a threshold function of acuity loss as a function of proximity.

In said example, one uses the variation model of objective accommodation as a function of prescribed addition as shown in FIG. 4 and the variation model of a threshold function of acuity loss as a function of proximity as shown in FIG. 5.

According to here above definitions, one determines, for a given prescription and given wearing conditions of the wearer, at a given point of the object space $(\alpha,\beta,ProxO)$, following features:

PPO$(\alpha,\beta,ProxO)$, which is the mean refractive power for a gaze direction $(\alpha,\beta)$ and a proximity ProxO;

ASR$(\alpha,\beta,ProxO)$, which is the residual astigmatism for a gaze direction $(\alpha,\beta)$ and a proximity ProxO;

PE_P$(\alpha,\beta,ProxO)$, which is the mean refractive power error for a gaze direction $(\alpha,\beta)$ at a given proximity, ProxO, and is determined according to following equation: PE_P$(\alpha,\beta,ProxO)$=PPO$(\alpha,\beta,ProxO)$−PPO(FV)−ProxO;

OA_P(ADD$_p$), which is the objective accommodation of the wearer and is determined as the result of a function of its prescribed addition, ADD$_p$, according to the model of FIG. 4, as illustrated by curve 40; the objective accommodation OA_P(ADD$_p$) represents the accommodation ability of the wearer, said ability is a function of the wearer's age and/or of the wearer's prescribed addition (wearer's age and wearer's prescribed addition are two features that can be considered as being correlated where the wearer's prescribed addition increases as a function of the wearer's age). In the present example, the objective accommodation is calculated according to following equation:

$$OA\_P(ADD_p) = \min(3, a0 - a1 \cdot ADD_p + a2 \cdot ADD_p^2), \text{ if } ADD_p \leq 2D;$$

$$OA\_P(ADD_p) = 0, \text{ if } ADD_p > 2D;$$

Where: $a0=3.9D$; $a1=3.8$; $a2=0.9D^{-1}$

RPE_P$(\alpha,\beta,ProxO)$, which is the residual power error for a gaze direction $(\alpha,\beta)$ at a given proximity, ProxO, and is determined according to following equation:

$$RPE\_P(\alpha,\beta,ProxO) = \max((-PE\_P(\alpha,\beta,ProxO) - OA\_P(ADD_p)), 0), \text{ if } PE\_P(\alpha,\beta,ProxO) < 0; \text{ and}$$

$$RPE\_P(\alpha,\beta,ProxO) = PE\_P(\alpha,\beta,ProxO), \text{ if } PE\_P(\alpha,\beta,ProxO) \geq 0.$$

the said residual power error is defined so as to take into account the accommodation ability of the wearer; actually, if PE_P$(\alpha,\beta,ProxO)<0$, the wearer can accommodate to compensate the residual power error, but limited to his objective accommodation; if PE_P$(\alpha,\beta,ProxO)\geq 0$, the wearer cannot accommodate to compensate the residual power error.

RAE_P$(\alpha,\beta,ProxO)$, which is the residual astigmatism error for a gaze direction $(\alpha,\beta)$ at a given proximity, ProxO, and is equal to ASR$(\alpha,\beta,ProxO)$ for all proximities of a same gaze direction $(\alpha,\beta)$ because the wearer cannot compensate the residual astigmatism of the lens.

AC %_P($\alpha,\beta$,ProxO), which is the relative acuity for a gaze direction ($\alpha,\beta$) at a given proximity, ProxO, and is determined according to following equation:

AC %_$P(\alpha,\beta,\text{Prox}O)$=100−63×RPE_$P(\alpha,\beta,\text{Prox}O)$−44.3×RAE_$P(\alpha,\beta,\text{Prox}O)$+7.2×RPE_$P(\alpha,\beta,\text{Prox}O)^2$+19.5×RPE_$P(\alpha,\beta,\text{Prox}O)$·RAE_$P(\alpha,\beta,\text{Prox}O)$+RAE_$P(\alpha,\beta,\text{Prox}O)^2$.

ACU_P($\alpha,\beta$,ProxO)=−Log(AC %_P/100), which is acuity loss for a gaze direction ($\alpha,\beta$) at a given proximity, ProxO, and is determined according to following equation: ACU_P($\alpha,\beta$,ProxO)=−log(AC %_P($\alpha,\beta$,ProxO)/100), when considering the wearer's maximal acuity as being equal to 10/10, and ACU_P($\alpha,\beta$,ProxO) is expressed in log MAR.

The three dimensional performance of the ophthalmic progressive addition is determined by considering the acuity loss for a plurality of gaze directions ($\alpha,\beta$) at a plurality of proximities, ProxO, in view of a threshold function which gives a plurality of threshold values as a function of the proximity, ProxO. The domain of step iv. of the method is a three dimensional domain that incorporates the ($\alpha,\beta$,ProxO) points where the acuity loss is equal or less to the threshold values of the threshold function, and the three dimensional performance of the ophthalmic progressive addition lens is the internal volume of said domain.

The resulting curve 50 of the threshold function is shown in FIG. 5 and defines acuity loss threshold values as a function of proximity; when ProxO≤1.5, then the acuity loss threshold value is equal to 0.2; when ProxO>2, then the acuity loss threshold value is equal to 0.1; for in between proximities, the acuity loss threshold values are determined by interpolation of the linear slope joining said two acuity loss threshold values.

Furthermore, all the gaze directions ($\alpha,\beta$) that are considered to determine the three dimensional performance have to intercept a surface limited by a contour. According an embodiment, the contour is the periphery of the ophthalmic lens when considering an unframed ophthalmic lens; according to another embodiment, the contour is the internal periphery of a circle of a spectacle frame when the ophthalmic lens is mounted in said spectacle frame. According to an embodiment, the contour is circular.

According to a first embodiment for determining the three dimensional performance of the ophthalmic progressive addition, the three dimensional domain is determined by implanting following steps:

One considers an initial volume defined in the (x,y,z) coordinate system of FIG. 1, where:
x is comprised between −2000 mm and +2000 mm;
y is comprised between −2000 mm and +2000 mm;
z is comprised between −5000 mm and −200 mm.

Other initial volumes can be chosen.

Said initial volume is meshed with a volume step (dx,dy,dz), where for example dx=dy=dz=10 mm, thus defining a plurality of parallelepipedical volumes in the initial volume, each parallelepipedical volume having a volume equal to said volume step.

For each parallelepipedical volume, one calculates by ray tracing through the lens the values of PPO($\alpha,\beta$,ProxO) and ASR($\alpha,\beta$,ProxO), for the gaze direction ($\alpha,\beta$) intercepting the center of the parallelepipedical volume, and the proximity, ProxO, of the center of said volume; one calculates then the acuity loss for the gaze direction ($\alpha,\beta$) at said proximity, ProxO, ACU_P($\alpha,\beta$,ProxO), for each parallelepipedical volume of the initial volume, according to here above equations.

One defines the three dimensional performance of the ophthalmic progressive addition lens as the volume sum of the parallelepipedical volumes where the calculated acuity loss, ACU_P($\alpha,\beta$,ProxO), is equal or less to the threshold value of the threshold function of FIG. 5 for the proximity of each of the parallelepipedical volumes.

According to an embodiment, the volume sum of the parallelepipedical volumes is calculated as a discrete sum of the parallelepipedical volumes that fulfill the preceding condition; according to another embodiment, the volume sum of the parallelepipedical volumes is calculated as a continuous sum, thanks to considering a triple integral over the (x,y,z) space and according to (dx,dy,dz) where the preceding condition is fulfilled.

According to a second embodiment for determining the three dimensional performance of the ophthalmic progressive addition, the three dimensional domain is determined by implanting following steps:

One considers a solid angle in the ($\alpha,\beta$) coordinate system of FIG. 1 where:
$\alpha$ is comprised between −30° and +50°;
$\beta$ is comprised between −40° and +40°;

Said solid angle is meshed with an angular step, d$\alpha$, for the $\alpha$ angles and an angular step, d$\beta$3, for the $\beta$ angles, where for example d$\alpha$=d$\beta$=1°, thus defining a plurality of gaze directions within the said solid angle.

For each of said gaze directions, one calculate by ray tracing the ray path through the lens and determines the point I where the ray intercepts the front face (opposite to the eye) of the lens on the path to the image of the point M in the object space and the emerging gaze direction in the object space, R($\alpha,\beta$). One considers a distance increment dz along the emerging gaze direction, as for example dz=10 mm, and calculates the values of PPO($\alpha,\beta$) and ASR($\alpha,\beta$), for the gaze direction ($\alpha,\beta$) and the proximity, ProxO, corresponding to the successive positions separated by dz. One calculates then the acuity loss, ACU_P($\alpha,\beta$,ProxO), for a gaze direction ($\alpha,\beta$) at said proximity, ProxO, for each accordingly defined angle separated by the angular steps within the solid angle, and each incremental distance, according to here above equations.

One defines the three dimensional performance of the ophthalmic progressive addition lens as the volume sum of the (d$\alpha$, d$\beta$, dz) volumes where the calculated acuity loss, ACU_P($\alpha,\beta$,ProxO), is equal or less to the threshold value of the threshold function of FIG. 5 for the proximity of each (d$\alpha$, d$\beta$, dz) volume.

Figure 6:
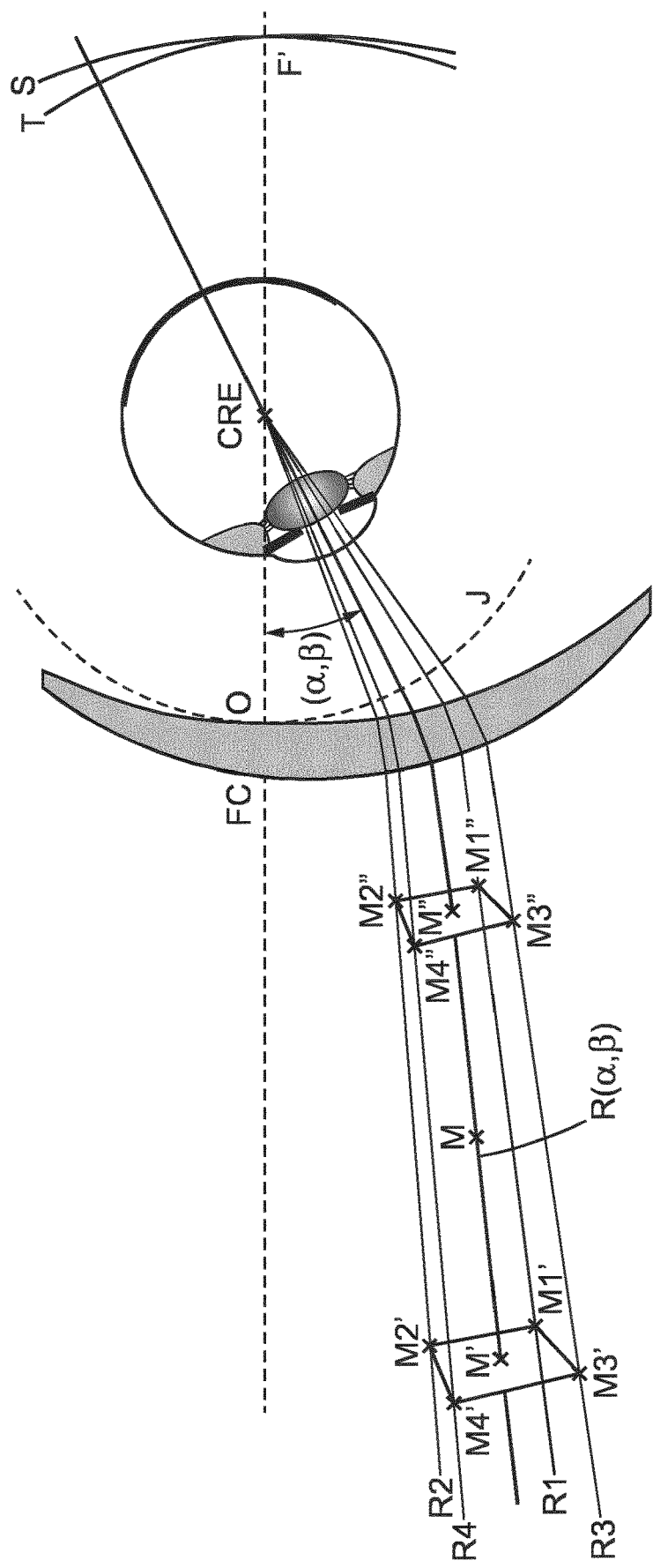
FIG. 6 shows, diagrammatically, an example of ray tracing that can be used for determining a three dimensional performance of an ophthalmic progressive addition lens according to the present invention.

An example of calculation of said three dimensional performance of the ophthalmic progressive addition lens as the volume where the calculated acuity loss, ACU_P($\alpha,\beta$, ProxO), is equal or less to the values of the threshold function is hereafter disclosed in view of FIG. 6.

FIG. 6 shows, diagrammatically, optical systems of eye and lens and ray tracing from the center of rotation of the eye when considering monocular vision as here above explained in view of FIG. 2, but when considering a plurality of gaze directions ($\alpha,\beta$) and corresponding emerging gaze directions.

When a point M(x,y,z) (in the (x,y,z) coordinate system and corresponding to ($\alpha,\beta$,ProxO) in the spherical coordinate system) is identified as point where ACU_P($\alpha,\beta$, ProxO) is equal or less to the value of the threshold function at the proximity ProxO, one determines corresponding emerging gaze direction R($\alpha,\beta$). One determines then two points, M' and M", where ACU_P is equal to the value of the threshold function at ray direction $R(\alpha,\beta)$ and one determines corresponding coordinates $M'(x',y',z')$ and $M''(x'',y'',z'')$.

One calculates emerging gaze directions R1, R2, R3, R4 where:
R1 has the angular coordinates $(\alpha+d\alpha/2, \beta+d\beta/2)$;
R2 has the angular coordinates $(\alpha-d\alpha/2, \beta+d\beta/2)$;
R3 has the angular coordinates $(\alpha+d\alpha/2, \beta-d\beta/2)$;
R4 has the angular coordinates $(\alpha-d\alpha/2, \beta-d\beta/2)$;

One meshes said emerging gaze directions so as to determine:
$M1'(x1', y1', z1')$ and $M1''(x1'', y1'', z1'')$;
$M2'(x2', y2', z2')$ and $M2''(x2'', y2'', z2'')$;
$M3'(x3', y3', z3')$ and $M3''(x3'', y3'', z3'')$;
$M4'(x4', y4', z4')$ and $M4''(x4'', y4'', z4'')$;

where ACU_P is equal to the value of the threshold function at corresponding proximity ProxO and one calculates corresponding volume thanks to known geometrical calculation means.

One gives now an example of actual calculation of a three dimensional performance of an ophthalmic progressive addition lens according to the method of the present invention recited as the here above first example.

Said ophthalmic progressive addition lens has been designed so as to fulfil following prescribed features:
prescribed sphere $SPH_p=0$ Diopter;
prescribed astigmatism value $CYL_p=0$ Diopter;
prescribed axis $AXIS_p=0°$;
prescribed addition $ADD_p=2$ Diopter;

The lens has a contour that delimits the gaze direction field and said contour is a 35 mm radius circle.

Wearing conditions are following:
the pantoscopic angle is −8°;
the wrap angle is 0°;
the distance between the CRO and the lens is 25.5 mm.

Calculations are performed in the monocular eye referential as here above explained when discussing FIG. 1.

Figure 7:
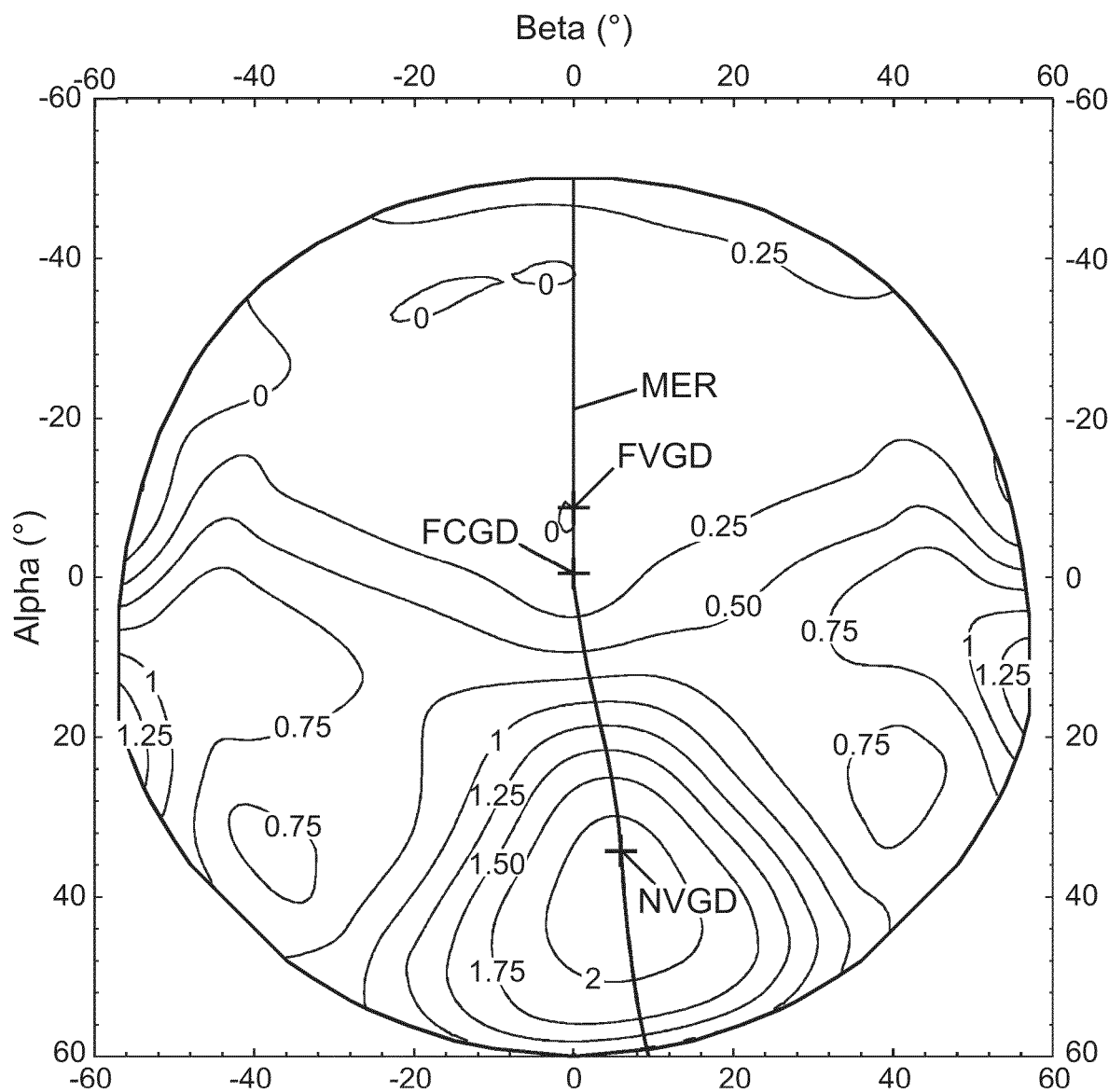
FIGS. 7 and 8 give optical characteristics of an ophthalmic progressive addition lens.
Figure 8:
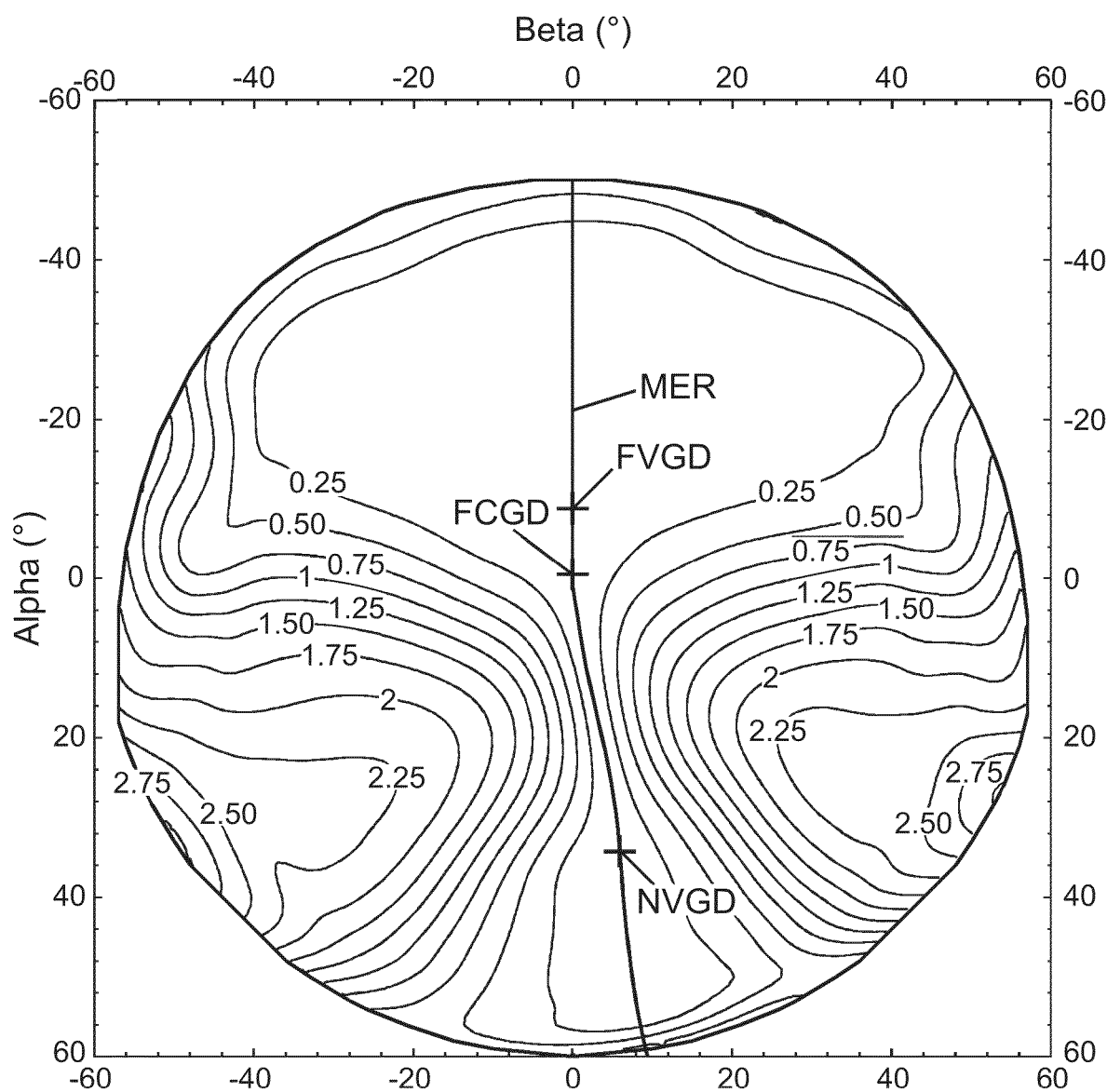

FIGS. 7 and 8 give optical characteristics of the said ophthalmic progressive addition lens calculated for the right eye. FIG. 7 represents the mean refractive power repartition, PPO, over the $(\alpha, \beta)$ domain, for said lens. Curves indicates iso-mean refractive power values where there is an increment of 0.25 Diopter between neighbouring curves of different iso-mean refractive power values. FIG. 8 represents the module of resulting astigmatism repartition, ASR, over the $(\alpha, \beta)$ domain, for said lens. Curves indicates iso-module of resulting astigmatism values where there is an increment of 0.25 Diopter between neighbouring curves of different module of resulting astigmatism values.

The three dimensional performance of said ophthalmic progressive addition lens has been calculated for an initial volume defined in the (x,y,z) coordinate system of FIG. 1, where:
x is comprised between −500 mm and +500 mm;
y is comprised between −500 mm and 0 mm;
z is comprised between −700 mm and −400 mm.

In the calculations, volume steps (dx,dy,dz) are dx=dy=dz=10 mm.

Based on those data:
The total volume that has been explored is equal to 159.7 dm³ (cubic decimeter);
The effective volume defined as the volume within which gaze direction can pass according to the contour is equal to 159.3 dm³;
The volume where the acuity loss, $ACU\_P(\alpha,\beta,ProxO)$, is equal or less to the threshold value of the threshold function of FIG. 5 for each corresponding proximity, said volume corresponding to the three dimensional performance of the said ophthalmic progressive addition lens, is equal to 8.6 dm³.

The said volumes can be represented in three dimensions, for example in the (x,y,z) coordinate system. The method of the present invention may comprise a step of calculating and displaying data to a terminal so as to provide a graphical representation of the said volumes.

Figure 9:
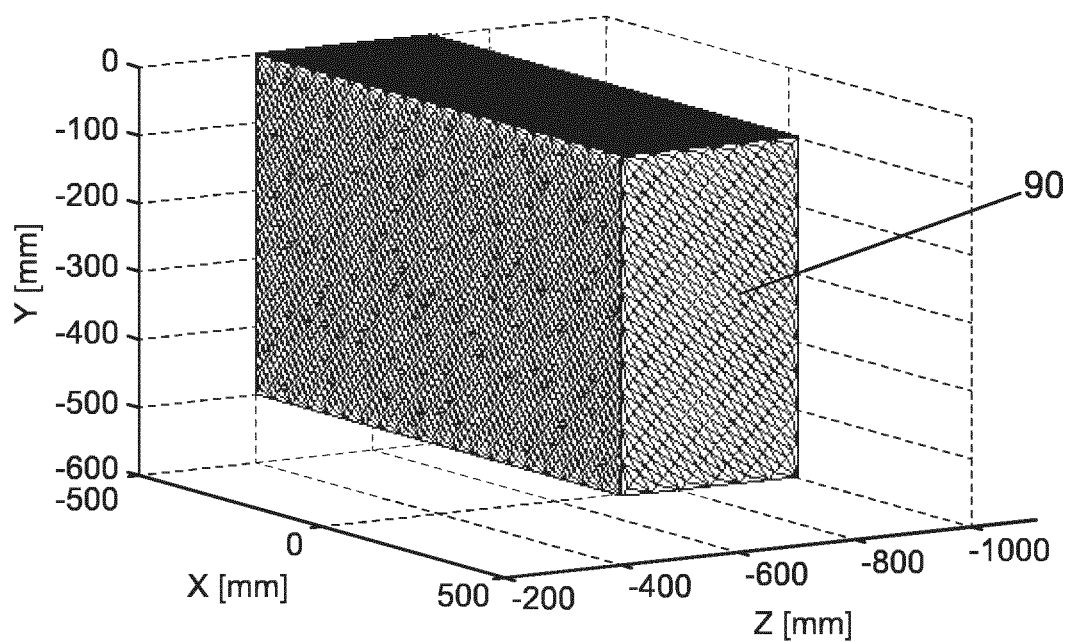
FIGS. 9 to 11 show three dimensional features of the ophthalmic progressive addition lens of FIGS. 7 and 8, said features comprising a three dimensional performance determined according to the present invention.
Figure 10:
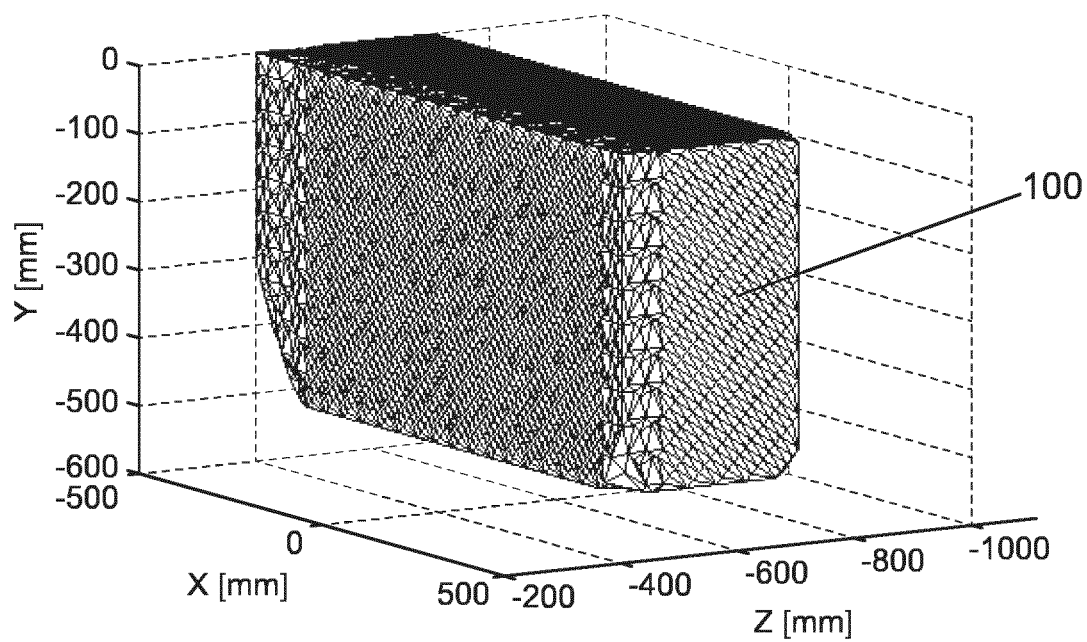
Figure 11:
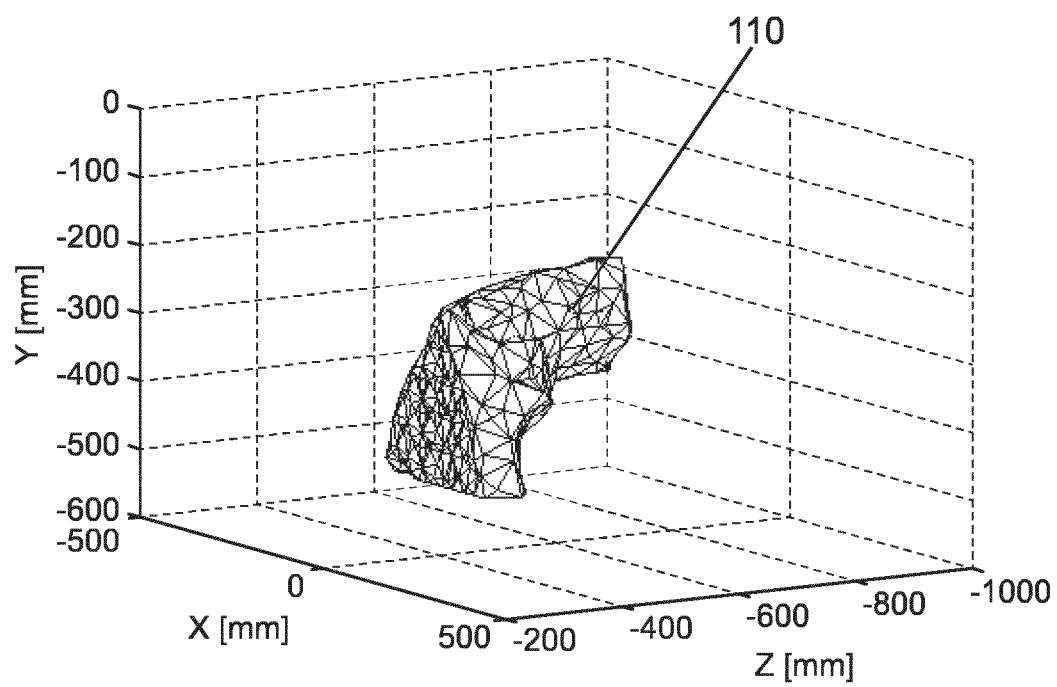

FIGS. 9 to 11 show respectively the total volume, the effective volume and the three dimensional performance volume for the exemplified lens.

SECOND EXAMPLE

A second example is given which is directed to another embodiment of the method of the present invention for calculating an ophthalmic progressive addition lens delimited by a given contour for a wearer with a given prescription and given wearing conditions, said method comprising a step of providing a three dimensional performance target defined as a function of the three dimensional performance determined according to the method of the first example, and using said three dimensional performance target to calculate the ophthalmic progressive addition lens for the wearer.

In said example:
the three dimensional performance target is equal to the three dimensional performance;
the method of calculating an ophthalmic progressive addition lens comprises an optimization step implementing a plurality of targets, said targets comprising at least the prescription of the wearer and the three dimensional performance target;
the local optical criterion of step i. is acuity loss of the wearer and one calculates a mean refractive power, PPO, a module of resulting astigmatism, ASR, for a plurality of gaze directions and for a plurality of proximities, so as to calculate the said acuity loss according to an acuity loss model.

The inventors have used the ophthalmic progressive addition lens of here above ophthalmic progressive addition lens example, which dioptric features correspond to FIGS. 7 and 8, as a starting lens for the optimization step and have considered calculating a new ophthalmic progressive addition lens that fulfil following prescribed features:
prescribed sphere $SPH_p=0$ Diopter;
prescribed astigmatism value $CYL_p=0$ Diopter;
prescribed axis $AXIS_p=0°$;
prescribed addition $ADD_p=2$ Diopter;
and where the three dimensional performance (as here above defined, in the frame of example 1) is used as a target.

Wearing conditions, binocular behaviour and contour remain identical to those of the starting lens, as here above recited.

The optimization step can be performed by using optimization algorithms. These methods are known by the one skilled in the art, for example in the publication "Application of optimization in computer-aided ophthalmic lens design" (P. Allione, F. Ahsbahs and G. Le Saux, in SPIE Vol. 3737, EUROPTO Conference on Design and Engineering of Optical Systems, Berlin, May 1999), which is incorporated by reference in the present document.

Thanks to introducing the three dimensional performance as a target in the frame of the optimization steps, the inventors have been able to calculate an ophthalmic progressive addition lens with an enhanced three dimensional performance.

Figure 12:
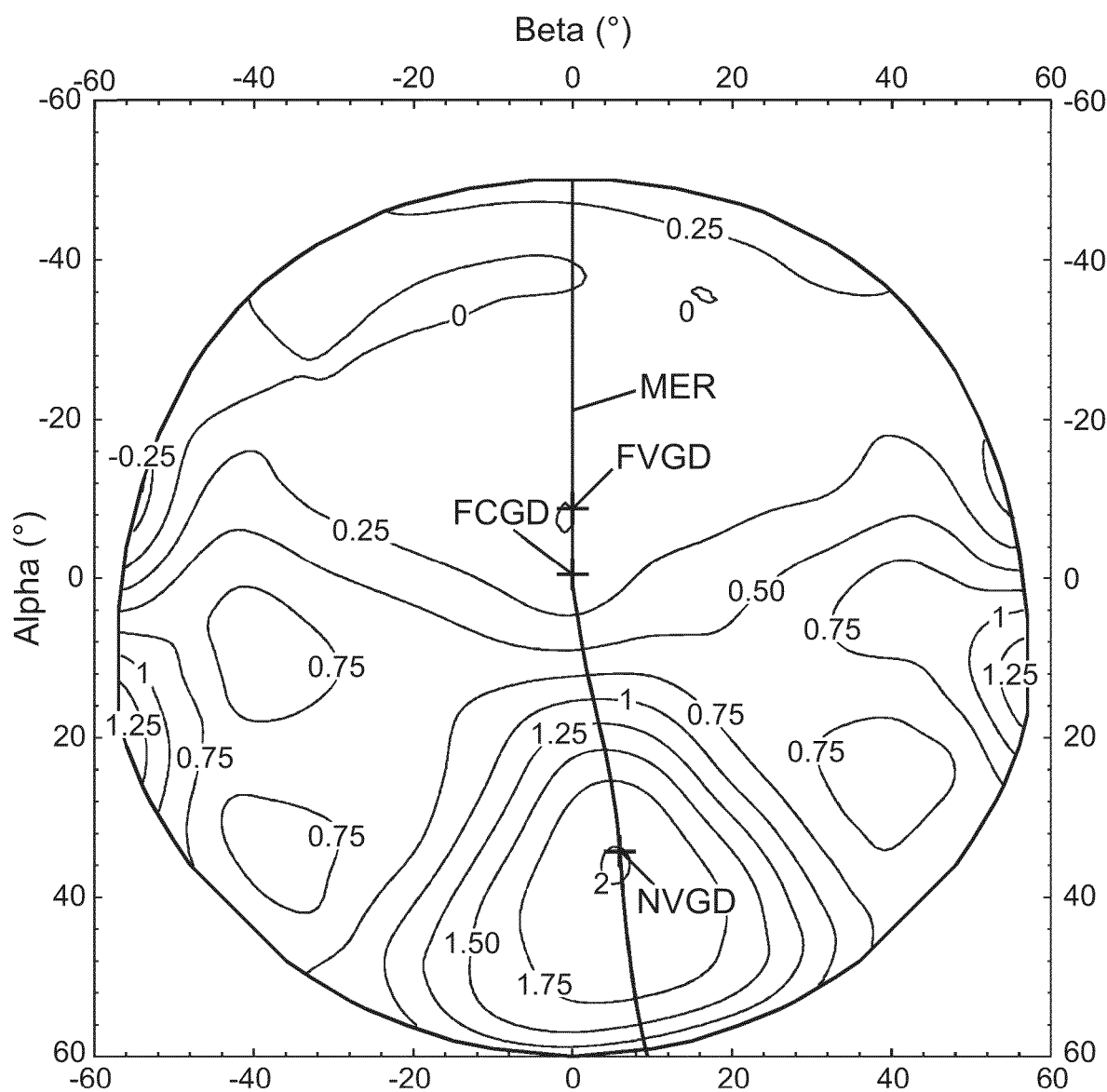
FIGS. 12 and 13 give optical characteristics of an ophthalmic progressive addition lens obtained thanks to the method of calculating an ophthalmic progressive addition lens of the present invention.
Figure 13:
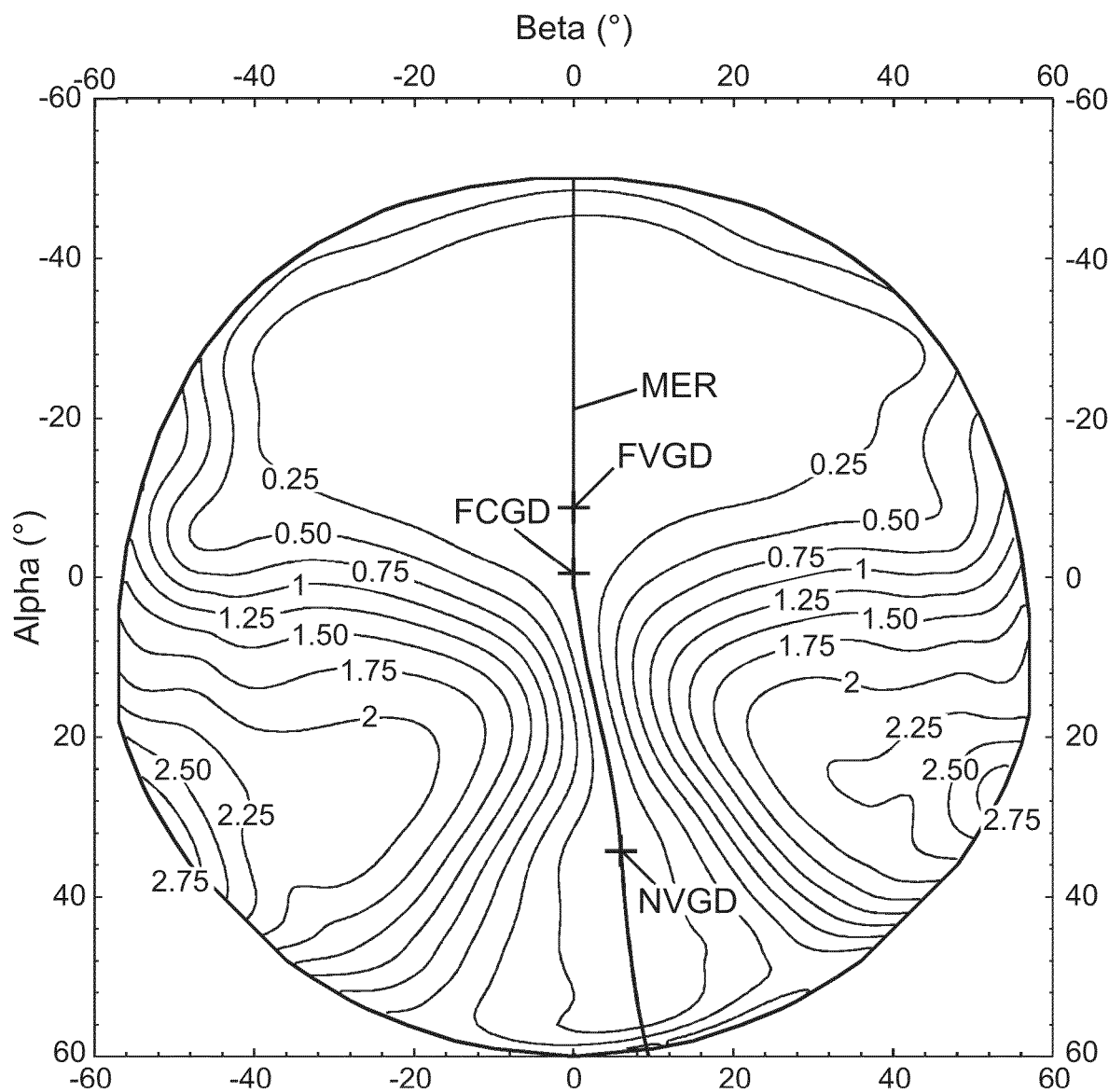
Figure 14:
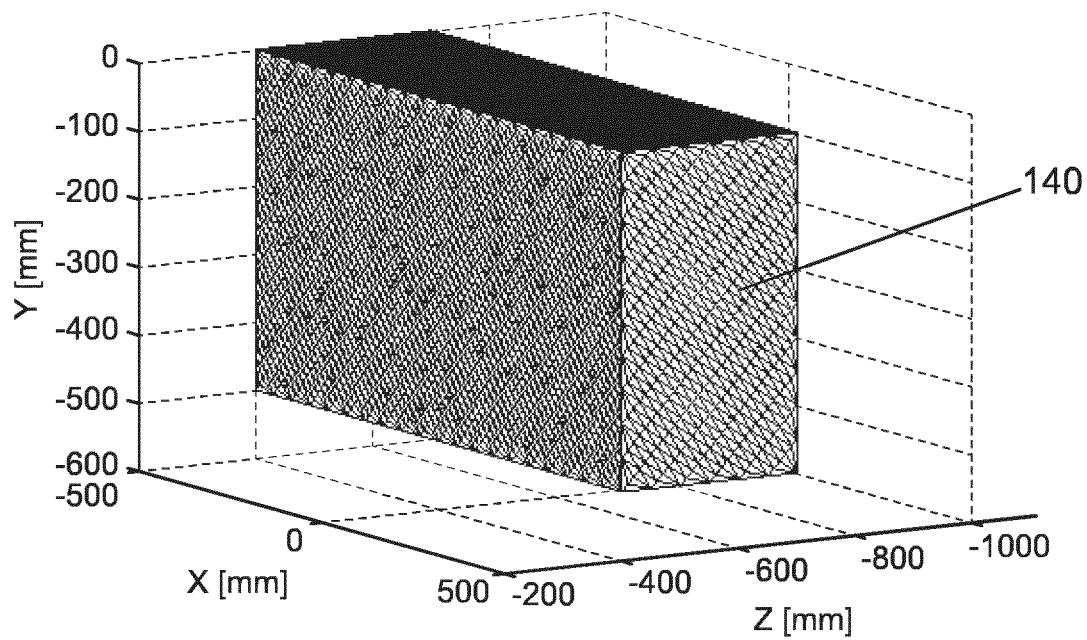
FIGS. 14 to 16 show three dimensional features of the ophthalmic progressive addition lens of FIGS. 12 and 13.
Figure 15:
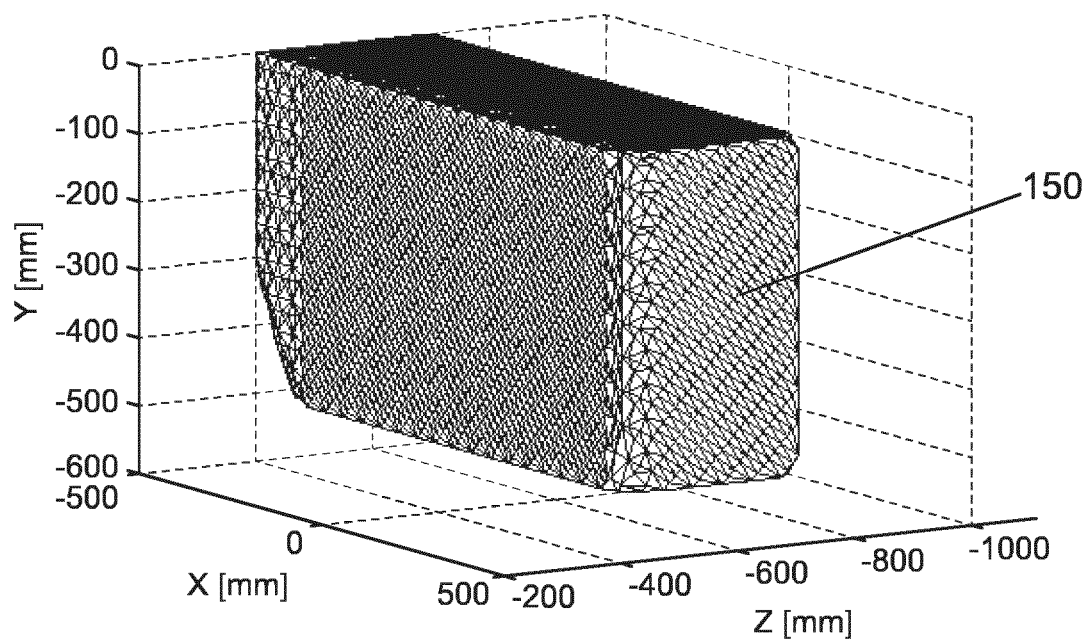
Figure 16:
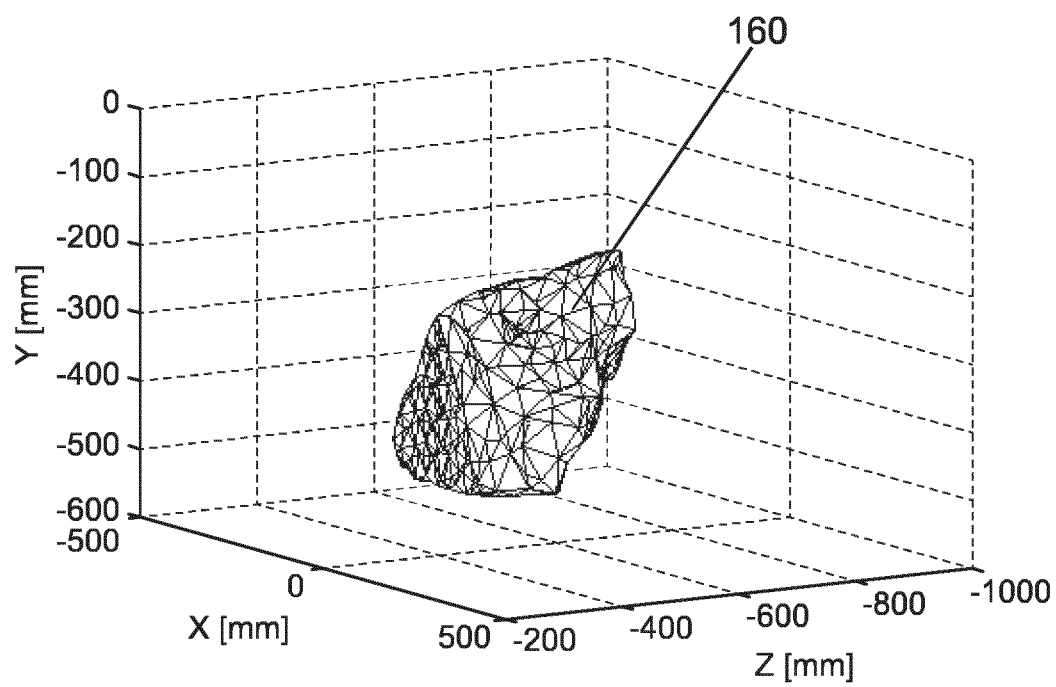

The results corresponding to the enhanced ophthalmic progressive addition lens calculated for the right eye are illustrated by FIGS. 12 to 16, where:

FIGS. 12 and 13 relate to the optical characteristics of the enhanced ophthalmic progressive addition lens (respectively PPO and ASR over the ($\alpha$, $\beta$) domain) and said figures can be compared to respectively FIGS. 7 and 8 showing the optical characteristics of the starting lens for the optimization step thank to an identical graphical representation of the results for each lens;

FIGS. 14 to 16 show respectively the total volume, the effective volume and the three dimensional performance volume for the enhanced ophthalmic progressive addition lens and said figures can be compared to respectively FIGS. 9 to 11 showing the total volume, the effective volume and the three dimensional performance volume of the starting lens for the optimization step thank to an identical graphical representation of the results for each lens.

One can clearly see that FIGS. 7 and 12 are very similar and only have minor differences; same applies for FIGS. 8 and 13; it clearly indicates that the two lenses have very similar dioptric features; according to common analysis, one could consider that said two lenses are roughly identical.

But differences appear when bringing into focus the three dimensional performances of the two ophthalmic progressive addition lenses.

The calculated volumes for the enhanced ophthalmic progressive addition lens are following:

The total volume that has been explored is equal to 159.7 dm$^3$ (cubic decimeter);

The effective volume defined as the volume within which gaze direction can pass according to the contour is equal to 159.4 dm$^3$;

The volume where the acuity loss, ACU_P($\alpha,\beta$,ProxO), is equal or less to the threshold value of the threshold function of FIG. 5 for each corresponding proximity, said volume corresponding to the three dimensional performance of the said ophthalmic progressive addition lens, is equal to 12.8 dm$^3$.

One can clearly see that the three dimensional performance of the said ophthalmic progressive addition lens is enhanced by about 50% when compared to the one of the starting ophthalmic progressive addition lens.

Thanks to the method of the present invention, one can define and calculate three dimensional performances that can be advantageously used as target of enhancing features of an ophthalmic progressive addition lens.

One has further to underline that the initial volume defined in the (x,y,z) coordinate system can be chosen according to a chosen visual task. In here above examples, the initial volume has been chosen to relate to an intermediate vision task, where viewing distances to be considered are between 400 and 700 mm.

A plurality of vision tasks can be defined where one would consider the viewing distances according to the chosen task.

It is also possible to take into account a plurality of vision tasks for optimizing a same ophthalmic progressive addition lens and thus introducing targets for each of the chosen vision tasks in the frame of the optimization steps.

According to other examples, the present invention is directed to a method implemented by computer means of calculating an ophthalmic lens delimited by a given contour for a wearer with a given prescription and given wearing conditions, said method comprising a step of providing a three dimensional performance target defined as a function of the three dimensional performance, where the three dimensional performance is a measured performance for the said wearer, and using said three dimensional performance target to calculate the ophthalmic lens for the wearer.

The three dimensional performance for the said wearer can be measured according to a plurality of measurement methods.

According to an embodiment, the measured three dimensional performance is the result of a measurement of the visual volume that encompasses the fixation points of the wearer when implementing a visual task. According to an embodiment, the visual task is seeing in near vision, for example reading. According to another embodiment, the visual task is seeing in intermediate vision, for example looking at a computer screen. Said measurement can be made as a function of an object to be seen and/or as a function of a work being done by the wearer and/or as a function of a posture of the wearer. An object to be seen can be for example a newspaper, a tablet, a smartphone, a computer screen. A work to be done by the wearer can be for example writing, browsing, reading, and interacting with an object. A posture of the wearer can be for example standing, sitting, lying.

The fixation points can be measured by simultaneously determining the gaze directions of the wearer and the actual position of an object to be seen.

The gaze directions of the wearer can be measured thanks to eye tracking.

The actual position of an object to be seen can be measured by using binocular measurements so as to determine the object's distance; it can also be measured by object tracking thanks to sensors.

Head tracking can also be implemented.

Body and/or motion tracking can also be implemented.

A plurality of said tacking methods can be simultaneously implemented.

The invention has been described above with the aid of embodiments without limitation of the general inventive concept, in particular numerous calculation and/or manufacturing methods known from the man skilled in the art could be used in order to adapt the management of residual astigmatism according to the present invention.

The invention claimed is:

1. A method for manufacturing an ophthalmic lens, the method being implemented by computer for calculating an ophthalmic lens delimited by a given contour for a wearer with a given prescription and given wearing conditions, the method comprising:

a) providing at least one local optical criterion, wherein the at least one local optical criterion is an optical criterion that can be defined for each point of a three dimensional object or image space;

b) providing for each local optical criterion of the local optical criterion of a) a threshold function which gives threshold values for the local optical criterion as a function of the proximity;

c) providing for each local optical criterion of the local optical criteria of a) a condition between the local optical criterion and the threshold values of b) provided for the local optical criterion;

d) calculating a three dimensional domain incorporating points corresponding to gaze directions and proximities wherein the condition of c) between the local optical criterion of a) and the at threshold values of b) are fulfilled;

e) determining the three dimensional performance of the ophthalmic lens according to the three dimensional domain calculated in d), wherein determining the three dimensional performance of the ophthalmic lens comprises calculating the internal volume of the three dimensional domain of step d);

wherein the three dimensional domain is defined according to an (α,β,ProxO) spatial reference system or according to an (α,β,ProxI) spatial reference system, where α is a lowering angle and β is an azimuth angle, ProxO is an object proximity and ProxI is an image proximity;

f) calculating the ophthalmic lens for the wearer, wherein calculating the ophthalmic lens for the wearer comprises optimizing the calculated ophthalmic lens by implementing a plurality of targets, the targets comprising at least the prescription of the wearer and the three dimensional performance target, and g) manufacturing the optimized ophthalmic lens.

2. A non-transitory computer readable medium having stored therein a computer program product comprising one or more stored sequence of instruction that is accessible to a processor and which, when executed by the processor, causes the processor to carry out the method of claim 1.

3. The method as claimed in claim 1, wherein the local optical criterion is chosen from: mean refractive power error; residual power error; resulting astigmatism; acuity loss; relative acuity; prismatic deviation; ocular deviation; local magnification; High Order Aberration (HOA); variation and/or combination of preceding criteria.

4. The method as claimed in claim 3, wherein the local optical criterion is acuity loss of the wearer, wherein providing at least one local optical criterion comprises calculating the acuity loss is calculated according to an acuity loss model taking into account mean refractive power, module of resulting astigmatism for a plurality of gaze directions and for plurality of proximities.

5. The method as claimed in claim 1, wherein the condition between the local optical criterion and the threshold value is an inequality between the local optical criterion and the threshold value.

6. The method as claimed in claim 5, wherein the calculation of d) is performed in binocular vision for the wearer.

7. The method as claimed in claim 1, wherein the calculation of d) is performed in binocular vision for the wearer.

8. The method as claimed in claim 1, further comprising calculating and displaying data to a terminal to provide a graphical representation of the three dimensional performance.

9. The method as claimed in claim 1, wherein the threshold function is a function of one or of a plurality of parameters from: a fixation point position; a gaze direction; a visual task; lighting conditions; an age; a gender; a subject's visual acuity.

* * * * *